United States Patent
Ngu

(10) Patent No.: US 9,933,975 B1
(45) Date of Patent: Apr. 3, 2018

(54) DATA TRANSMISSION METHOD, MEMORY STORAGE DEVICE AND MEMORY CONTROL CIRCUIT UNIT

(71) Applicant: EpoStar Electronics Corp., Hsinchu (TW)

(72) Inventor: Di-Hsien Ngu, Hsinchu County (TW)

(73) Assignee: EpoStar Electronics Corp., Hsinchu (TW)

( * ) Notice: Subject to any disclaimer, the term of this patent is extended or adjusted under 35 U.S.C. 154(b) by 0 days.

(21) Appl. No.: 15/352,590

(22) Filed: Nov. 16, 2016

(30) Foreign Application Priority Data

Sep. 9, 2016 (TW) .............................. 105129269 A

(51) Int. Cl.
*G06F 3/06* (2006.01)

(52) U.S. Cl.
CPC ............ *G06F 3/0656* (2013.01); *G06F 3/061* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 5,819,053 A * | 10/1998 | Goodrum | G06F 11/349 710/100 |
| 2013/0013853 A1* | 1/2013 | Yeh | G06F 12/0246 711/103 |
| 2017/0242753 A1* | 8/2017 | Sherlock | G06F 11/1088 |

* cited by examiner

*Primary Examiner* — Kevin Verbrugge
(74) *Attorney, Agent, or Firm* — JCIPRNET

(57) ABSTRACT

A data transmission method, a memory storage device and a memory control circuit unit are provided. The method includes: obtaining a first command from a host system and counting a first time value; performing a first access operation corresponding to the first command on the rewritable non-volatile memory module; and generating a first completion message corresponding to completion of the first access operation and buffering the first completion message in a buffer area; and transmitting the first completion message buffered in the buffer area to the host system if the first time value meets a first waiting time value. Accordingly, a data access speed detected by the host system is stabilized.

24 Claims, 8 Drawing Sheets

DATA TRANSMISSION METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 105129269, filed on Sep. 9, 2016. The entirety of the above-mentioned patent application is hereby incorporated by reference herein and made a part of this specification.

BACKGROUND

1. Technology Field

The disclosure relates to a data transmission mechanism, and particularly relates to a data transmission method, a memory storage device, and a memory control circuit unit.

2. Description of Related Art

The growth of digital cameras, mobile phones, and MP3 players has been rapid in recent years. Consequently, the consumers' demand for storage media has increased tremendously. A rewritable non-volatile memory module (e.g., flash memory) fits well to be built in the electronic products due to its data non-volatility, low power consumption, small volume, and non-mechanical structure.

In some data transmission systems, after a storage device completes a data access task (e.g., reading data from or writing data to the storage device) assigned by a host system, the storage device may timely transmits a completion message to the host system to thereby notify the host system that a relevant data access operation is completed. In addition, the host system may also evaluate a data access speed of the storage device based on the received completion message.

In general, the storage device tends to prioritize the highest access speed to support the data access operation of the host system. However, under some circumstances (e.g., the host system continuously writes a large amount of data), the storage device may lower the data access speed due to internally required operations, such as moving data in the storage device, or even suspend the data access operation temporarily. After the relevant operation (e.g., moving data) is completed, the storage device will resume to operate at the highest access speed. Thus, in continuous data access operations, the host system may detect that the data access speed of the storage device is very unstable based on the received completion messages, and the performance evaluation on the storage device may thus be affected.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY OF THE DISCLOSURE

The disclosure provides a data transmission method, a memory storage device, and a memory control circuit unit capable of stabilizing a data access speed detected by a host system.

An exemplary embodiment of the disclosure provides a data transmission method for a memory storage device including a rewritable non-volatile memory module. The data transmission method includes: obtaining a first command from a host system and counting a first time value; performing a first access operation corresponding to the first command on the rewritable non-volatile memory module; and generating a first completion message corresponding to completion of the first access operation and buffering the first completion message in a buffer area; and transmitting the first completion message buffered in the buffer area to the host system if the first time value meets a first waiting time value.

Another exemplary embodiment of the disclosure provides a memory storage device. The memory storage device includes a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit is configured to obtain a first command from the host system and count a first time value. The memory control circuit unit is further configured to transmit a first access command sequence to instruct to perform a first access operation corresponding to the first command on the rewritable non-volatile memory module. The memory control circuit unit is further configured to generate a first completion message corresponding to completion of the first access operation and buffer the first completion message in a buffer area. If the first time value meets a first waiting time value, the memory control circuit unit is further configured to transmit the first completion message buffered in the buffer area to the host system.

Another exemplary embodiment of the disclosure provides a memory control circuit unit for controlling a rewritable non-volatile memory module. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to obtain a first command from the host system and count a first time value. The memory management circuit is further configured to transmit a first access command sequence to instruct to perform a first access operation corresponding to the first command on the rewritable non-volatile memory module. The memory management circuit is further configured to generate a first completion message corresponding to completion of the first access operation and buffer the first completion message in a buffer area. If the first time value meets a first waiting time value, the memory management circuit is further configured to transmit the first completion message buffered in the buffer area to the host system.

Based on the above, after the access command is obtained from the host system, the time value corresponding to the access command starts to be counted, and the access operation corresponding to the access command is performed. After the completion message corresponding to completion of the access operation is generated, the completion message is buffered (i.e., temporarily stored) in the buffer area. When the counted time value meets the waiting time value, the completion message is retrieved from the buffer area and transmitted to the host system. Compared with a case where no delay is set for the transmission of the completion message, the present exemplary embodiments of the disclosure may stabilize the data access speed detected by the host system.

In order to make the aforementioned and other features and advantages of the disclosure comprehensible, several exemplary embodiments accompanied with figures are described in detail below.

It should be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
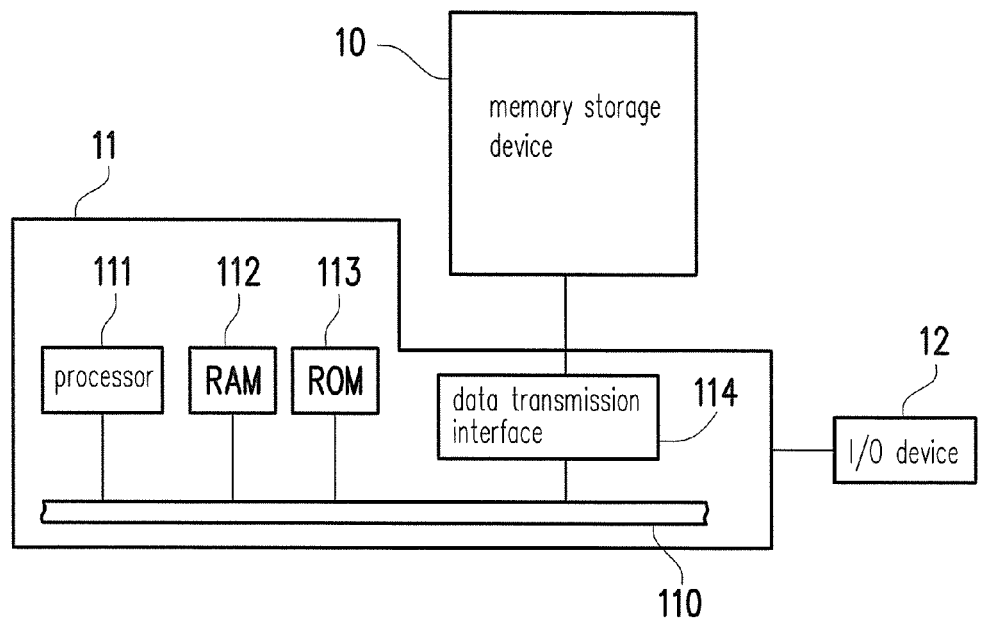
FIG. 1 is a schematic view illustrating a host system, a memory storage device, and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as memory storage system) includes a rewritable non-volatile memory module and a controller (also referred to as control circuit). The memory storage device is usually used together with a host system, such that the host system can write data into or read data from the memory storage device.

FIG. 1 is a schematic view illustrating a host system, a memory storage device, and an input/output (I/O) device according to an exemplary embodiment of the disclosure.

Figure 2:
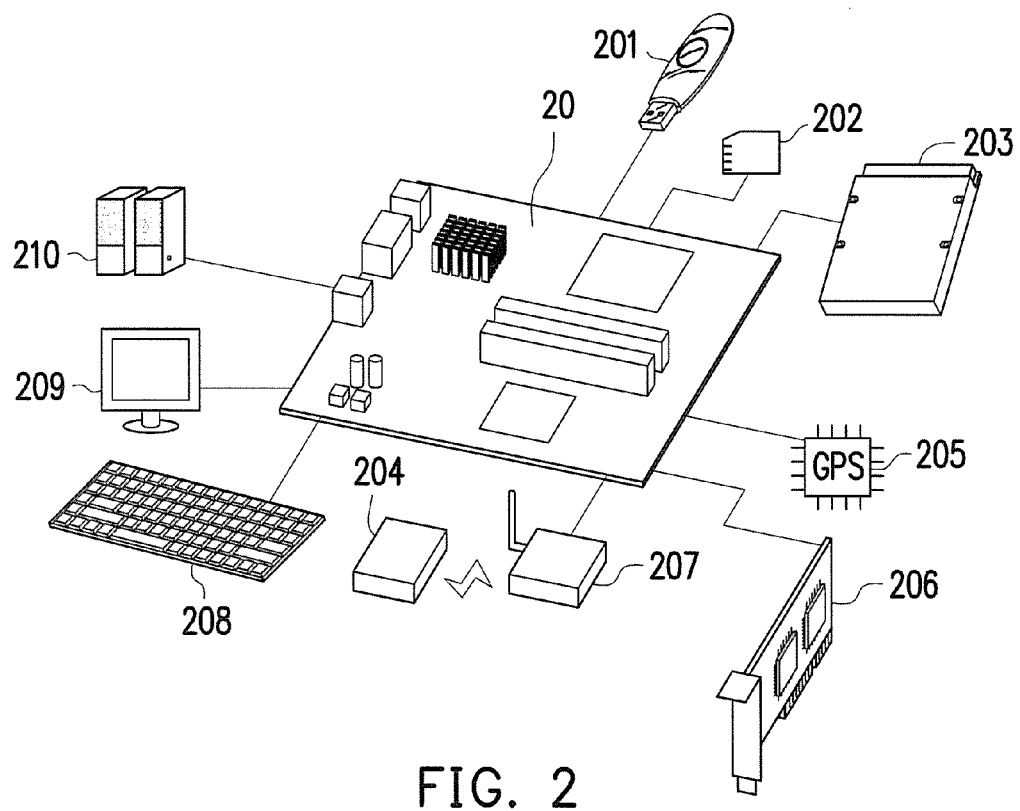
FIG. 2 is a schematic view illustrating a host system, a memory storage device, and an I/O device according to another exemplary embodiment of the disclosure.

FIG. 2 is a schematic view illustrating a host system, a memory storage device, and an I/O device according to another exemplary embodiment of the disclosure.

Referring to FIGS. 1 and 2, a host system 11 includes a processor 111, a random access memory (RAM) 112, a read only memory (ROM) 113, and a data transmission interface 114. The processor 111, the random access memory 112, the read only memory 113, and the data transmission interface 114 are coupled to a system bus 110.

In the present exemplary embodiment, the host system 11 is coupled to a memory storage device 10 through the data transmission interface 114. For example, the host system 11 may store data to or read data from the memory storage device 10 through the data transmission interface 114. In addition, the host system 11 is coupled to the I/O device 12 through the system bus 110. For example, the host system 11 may transmit output signals to or receive input signals from the I/O device 12 through the system bus 110.

In the present exemplary embodiment, the processor 111, the random access memory 112, the read only memory 113, and the data transmission interface 114 may be disposed on a motherboard 20 of the host system 11. One or more data transmission interfaces 114 may be provided. Through the data transmission interface 114, the motherboard 20 may be coupled to the memory storage device 10 in a wired or wireless manner. The memory storage device 10 may be a flash drive 201, a memory stick 202, a solid state drive (SSD) 203, or a wireless memory storage device 204, for example. The wireless memory storage device 204 may be a memory storage device based on a variety of wireless communication technologies, such as a near field communication (NFC) memory storage device, a wireless fidelity (WiFi) memory storage device, a Bluetooth memory storage device, or a Bluetooth low energy memory storage device (e.g., iBeacon), etc. In addition, the motherboard 20 may be coupled to an I/O device of any kind, such as a global positioning system (GPS) module 205, a network interface card 206, a wireless transmission device 207, a keyboard 208, a monitor 209, a speaker 210, etc., through the system bus 110. For example, in an exemplary embodiment, the motherboard 20 may access the wireless memory storage device 204 through the wireless transmission device 207.

Figure 3:
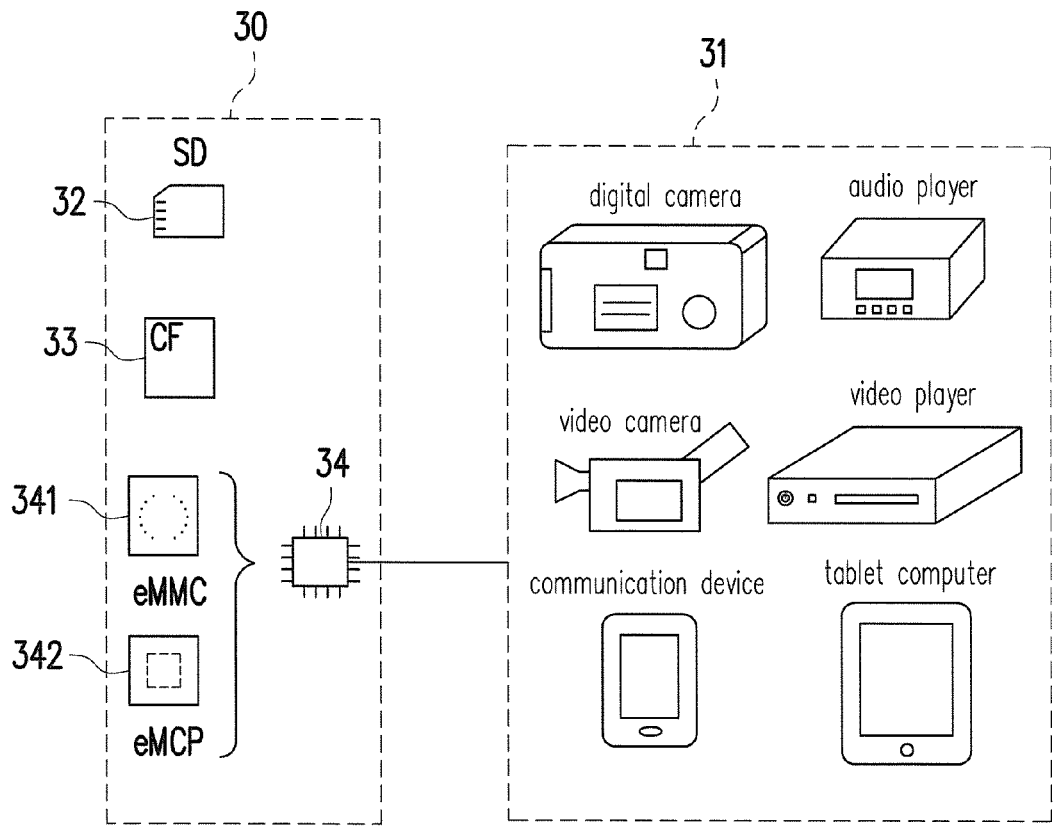
FIG. 3 is a schematic view illustrating a host system and a memory storage device according to another exemplary embodiment of the disclosure.

In an exemplary embodiment, the host system may be any system substantially capable of being used with a memory storage device to store data. Even though the host system is described as a computer system in the present exemplary embodiment, FIG. 3 is a schematic view illustrating a host system and a memory storage device according to another exemplary embodiment of the disclosure. Referring to FIG. 3, in the present exemplary embodiment, a host system 31 may also be a system such as a digital camera, a video camera, a communication device, an audio player, a video player, or a tablet computer, etc., and a memory storage device 30 may be a non-volatile memory storage device of any kind, such as a secure digital (SD) card 32, a compact flash (CF) card 33, or an embedded storage device 34, etc. The embedded storage device 34 includes an embedded storage device of any kind, where a memory module of any kind is directly coupled to a substrate of the host system, such as an embedded multimedia card (eMMC) 341 and/or an embedded multi-chip package (eMCP) storage device 342.

Figure 4:
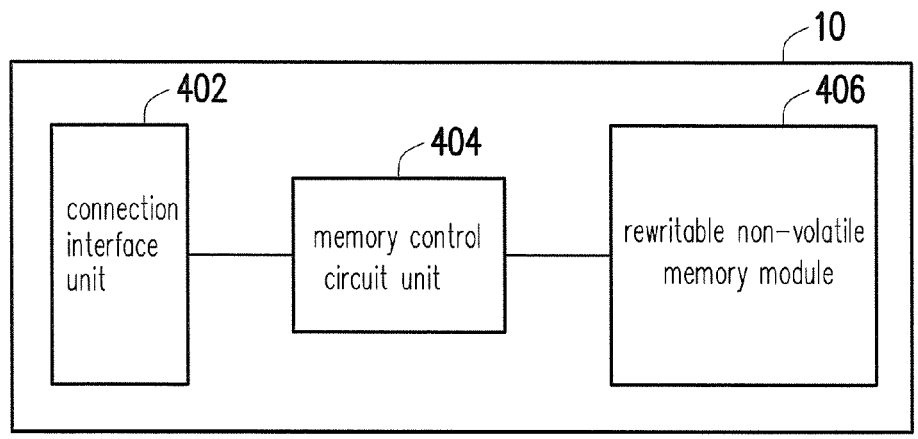
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In the present exemplary embodiment, the connection interface unit 402 is compatible with the non-volatile memory express (NVM express) interface standard. However, in another exemplary embodiment, the connection interface unit 402 may also be compatible with other suitable standards. In addition, the connection interface unit 402 may be packaged with the memory control circuit unit 404 within the same chip, or the connection interface unit 402 may be disposed outside a chip that includes the memory control circuit unit 404.

The memory control circuit unit 404 serves to execute a plurality of logic gates or control commands implemented in a hardware form or in a firmware form, and perform various data operations, such as data writing, data reading or data erasing in the rewritable non-volatile memory module 406 according to the commands of the host system 11.

The rewritable non-volatile memory module 406 is coupled to the memory control circuit unit 404 and configured to store data written by the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

Each memory cell in the rewritable non-volatile memory module 406 stores one or more bits by changing a voltage (also referred to as "threshold voltage" in the following). Specifically, a charge trapping layer is provided between a control gate and a channel of each memory cell. By applying a write voltage to the control gate, an amount of electrons of the charge trapping layer may be changed, thereby changing the threshold voltage of the memory cell. The operation of changing the threshold voltage of the memory cell is also referred to as "writing data to the memory cell" or "programming the memory cell". By changing the threshold voltage, each memory cell in the rewritable non-volatile memory module 406 may have a plurality of storage states. By applying a read voltage, the storage state of the memory cell may be determined to obtain one or more bits stored by the memory cell.

In the present exemplary embodiment, the memory cells of the rewritable non-volatile memory module 406 may constitute a plurality of physical programming units, and the physical programming units may constitute a plurality of physical erasing units. Specifically, memory cells on the same word line may form one or more physical programming units. If each memory cell stores two or more bits, the physical erasing units on the same word line may at least be classified into a lower physical programming unit and an upper physical programming unit. For example, a least significant bit (LSB) of a memory cell belongs to the lower physical programming unit, and a most significant bit (MSB) of a memory cell belongs to the upper physical programming unit. In general, in the MLC NAND flash memory, a write speed of the lower physical programming unit is higher than a write speed of the upper physical programming unit, and/or the reliability of the lower physical programming unit is higher than the reliability of the upper physical programming unit.

In the present exemplary embodiment, the physical programming unit is the smallest programming unit. Namely, the physical programming unit is the smallest unit for data writing. For example, the physical programming units are the physical page or physical sector. If the physical programming units are the physical page, the physical programming units usually include a data bit area and a redundancy bit area. The data bit area includes a plurality of physical sectors configured to store user data, and the redundant bit area serves to store system data (e.g., management data such as error correcting code). In the present exemplary embodiment, the data bit area includes 32 physical sectors, and the size of each physical sector is 512 bytes (Bs). However, in other exemplary embodiments, the data bit area may also include 8, 16, more, or fewer physical sectors, and the size of each physical sector may be greater or smaller. On the other hand, the physical erasing unit is the smallest unit for data erasing. Namely, each physical erasing unit has the smallest number of memory cells being erased together. For example, the physical erasing units are the physical block.

Figure 5:
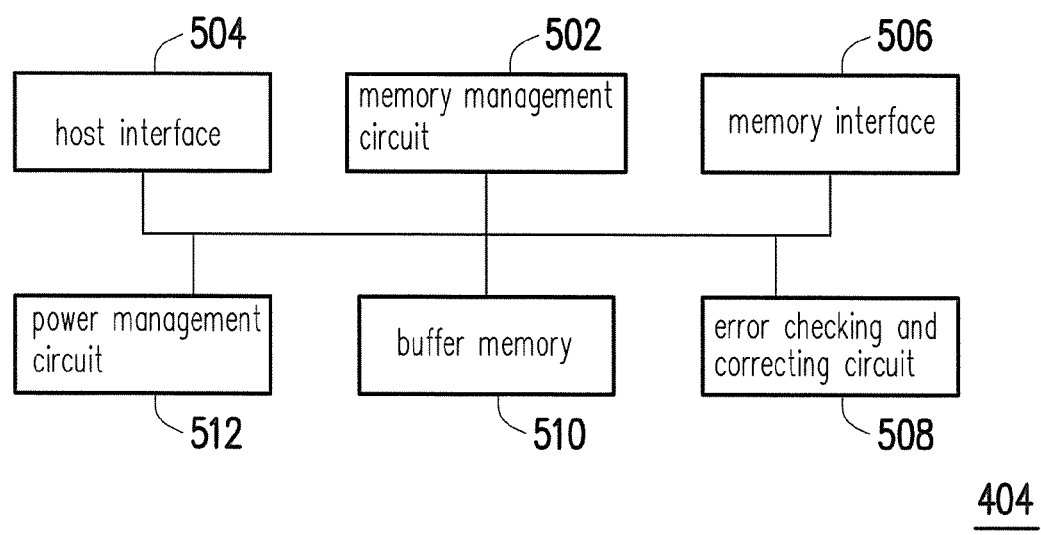
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. When the memory storage device 10 is in operation, the control commands are executed to perform various data operations such as data writing, data reading and data erasing. In the following, descriptions concerning the operation of the memory management circuit 502 are equivalent to descriptions concerning the operation of the memory control circuit unit 404.

In the present exemplary embodiment, the control commands of the memory management circuit 502 are implemented in a firmware form. For instance, the memory management circuit 502 has a microprocessor unit (not shown) and a read-only memory (not shown), and the control commands are burnt into the read-only memory. When the memory storage device 10 is in operation, the control commands are executed by the microprocessor unit for various data operations, such as data writing, data reading or data erasing.

In another exemplary embodiment, the control commands of the memory management circuit 502 may also be stored in a specific area (for example, the system area in the memory module exclusively used for storing system data) of the rewritable non-volatile memory module 406 as programming codes. Moreover, the memory management circuit 502 has a microprocessor unit (not shown), a read-only memory (not shown), and a random access memory (not shown). Specifically, the read-only memory has a boot code. When the memory control circuit unit 404 is enabled, the boot code is first executed by the microprocessor unit for loading the control commands stored in the rewritable non-volatile memory module 406 into the random access memory of the memory management circuit 502. Afterwards, the microprocessor unit executes the control commands for various data operations such as data writing, data reading and data erasing.

Besides, in another exemplary embodiment, the control commands of the memory management circuit 502 may also be implemented in a hardware form. For example, the memory management circuit 502 includes a micro-controller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the micro-controller. The memory cell management circuit is configured to manage the memory cells or groups thereof of the rewritable non-volatile memory module 406. The memory writing circuit is configured to transmit a writing command sequence to the rewritable non-volatile memory module 406 to write data to the rewritable non-volatile memory module 406. The memory reading circuit is configured to transmit a reading command sequence to the rewritable non-volatile memory module 406 to read data from the rewritable non-volatile memory module 406. The memory erasing circuit is configured to transmit an erasing command sequence to the rewritable non-volatile memory module 406 to erase data from the rewritable non-volatile memory module 406. The data processing circuit is configured to process data to be written to the rewritable non-volatile memory module 406 and data to be read from the rewritable non-volatile memory module 406. The writing command sequence, the reading command sequence, and the erasing command sequence may each include one or more program codes or command codes, and serve to instruct the rewritable non-volatile memory module 406 to perform the reading, writing, and erasing operations correspondingly. In an exemplary embodiment, the memory management circuit 502 may further transmit other types of command sequence to the rewritable non-volatile memory module 406 to instruct to perform corresponding operations.

The host interface 504 is coupled to the memory management circuit 502 and configured to receive and identify commands and data transmitted by the host system 11. Namely, the commands and data sent by the host system 11 are transmitted to the memory management circuit 502 through the host interface 504. In the present exemplary embodiment, the host interface 504 is compatible with the NVM express interface standard. However, in another exemplary embodiment, the connection interface unit 402 may also be compatible with other suitable standards.

The memory interface 506 is coupled to the memory management circuit 502 and configured to access the rewritable non-volatile memory module 406. In other words, data to be written to the rewritable non-volatile memory module 406 is converted into a format acceptable to the rewritable non-volatile memory module 406 by the memory interface 506. Specifically, if the memory management circuit 502 intends to access the rewritable non-volatile memory module 406, the memory interface 506 may transmit the corresponding command sequence. For example, the command sequences may include the writing command sequence instructing to write data, the reading command sequence instructing to read data, the erasing command sequence instructing to erase data, and the corresponding command sequences instructing to perform various memory operations (e.g., operations for changing a read voltage level or for performing a recycling operation, etc.). The command sequences are, for example, generated by the memory management circuit 502 and transmitted to the rewritable non-volatile memory module 406 through the memory interface 506. The command sequences may include one or more signals or data on a bus. The signals or data may include command codes or programming codes. For example, the reading command sequence may include information for reading, such as identification codes, memory addresses, or the like.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to perform an error checking and correcting operation to ensure the accuracy of data. Specifically, when the memory management circuit 502 receives a writing command from the host system 11, the error checking and correcting circuit 502 may generate an error correcting code (ECC) and/or an error detecting code (EDC) corresponding to the writing command, and the memory management circuit 502 may write data corresponding to the writing command and the corresponding error correcting code and/or error detecting code to the rewritable non-volatile memory module 406. Subsequently, when the memory management circuit 502 reads the data from the rewritable non-volatile memory module 406, the error correcting code and/or the error detecting code corresponding to the data is also read simultaneously, and the error checking and correcting circuit 508 may perform the error checking and correcting operation to the read data based on the error correcting code and/or the error detecting code.

The buffer memory 510 is coupled to the memory management circuit 502 and configured to temporarily store data and commands from the host system 11 or data from the rewritable non-volatile memory module 406. The power management circuit 512 is coupled to the memory management circuit 502 and configured to control the power of the of the memory storage device 10.

Figure 6:
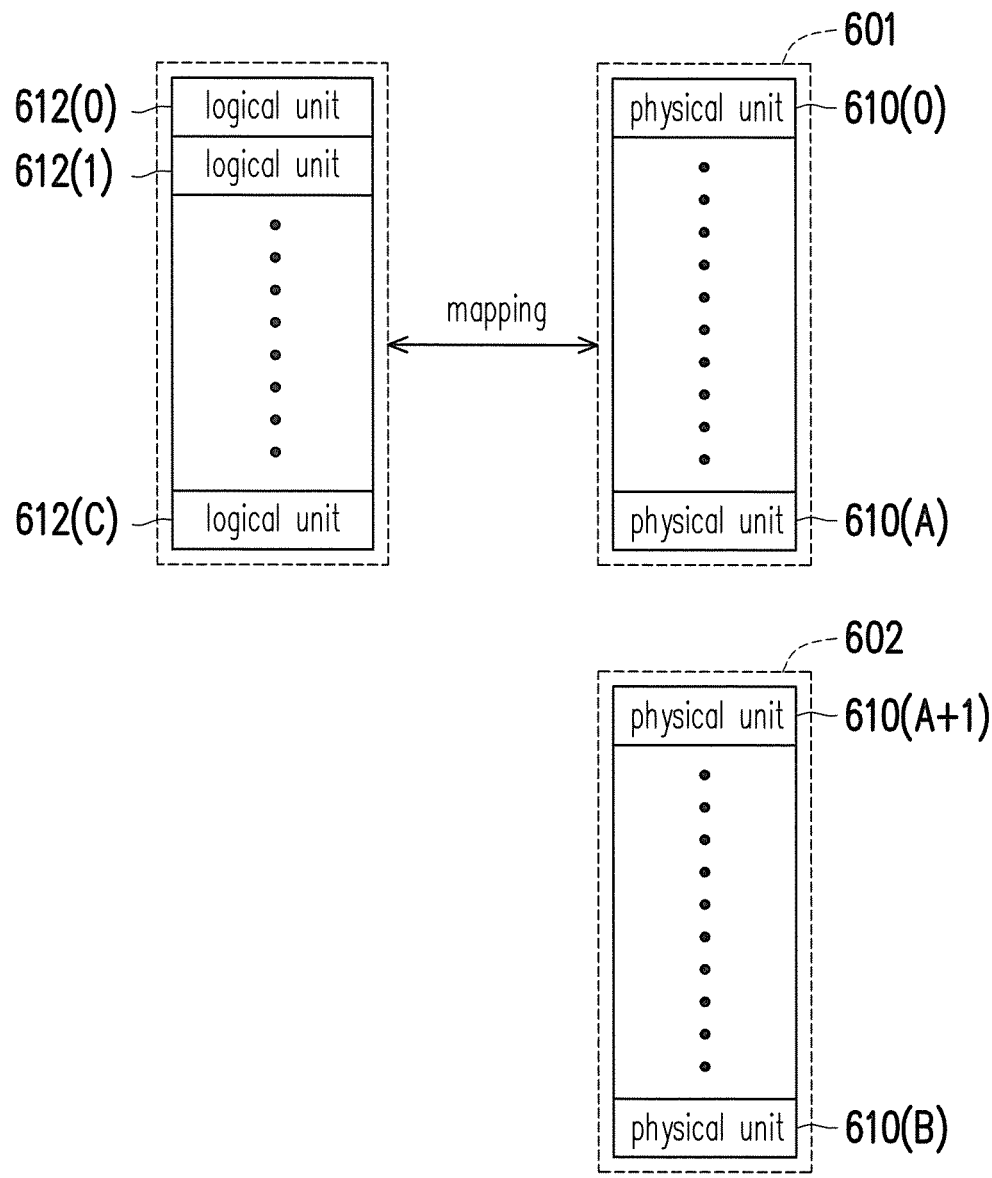
FIG. 6 is a schematic view illustrating management of a rewritable non-volatile memory module according to an exemplary embodiment of the disclosure.

FIG. 6 is a schematic view illustrating management of a rewritable non-volatile memory module according to an exemplary embodiment of the disclosure. It should be noted that, in the descriptions about the management of the rewritable non-volatile memory module 406, descriptions such as "selecting" and "grouping" refer to logical operational concepts. Namely, the actual positions of the respective physical components in the rewritable non-volatile memory module 406 are not changed, but logical operations are performed on some physical components of the rewritable non-volatile memory module 406.

Referring to FIG. 6, the memory management circuit 502 may logically group physical units 610(0) to 610(B) of the rewritable non-volatile memory module 406 into a storage area 601 and a replacement area 602. The physical units 610(0) to 610(A) in the storage area 601 serve to store data, whereas the physical units 610(A+1) to 610(B) serve to replace damaged physical units in the storage area 601. For example, if the data read from one of the physical units include too many errors to be corrected, the physical unit may be considered as a damaged physical unit. It should be noted that if no physical erasing unit is available in the replacement area 602, the memory management circuit 502 may declare a write protect state of the whole memory storage device 10, so that no data can be further written.

In the present exemplary embodiment, one physical unit refers to one physical erasing unit. However, in another exemplary embodiment, a physical erasing unit may also refer to a physical address or a physical programming unit, or may be formed by one or more continuous or discontinuous physical addresses. The memory management circuit 502 may allocate logical units 612(0) to 612(C) to map the physical units 610(0) to 610(A) in the storage area 601. In the present exemplary embodiment, each logical unit refers to one logical address. However, in another exemplary embodiment, a logical unit may also refer to a logical programming unit or a logical erasing unit, or may be formed by one or more continuous or discontinuous logical addresses. In addition, each of the logical units 612(0) to 612(C) may be mapped to one or more physical units.

The memory management circuit 502 may record mapping relations between the logical units and the physical units (also referred to as "logical-physical address mapping relations") in at least one logical-physical address mapping table. When the host system 11 intends to read data from or write data to the memory storage device 10, the memory management circuit 502 may perform an access operation on the memory storage device 10 based on the logical-physical address mapping table.

In the present exemplary embodiment, the memory storage device 10 is compatible with the NVM express interface standard. Compared with a storage device adopting the Serial Advanced Technology Attachment (SATA) standard, a communication mechanism between the memory storage device 10 and the host system 11 is different to a certain extent.

Figure 7:
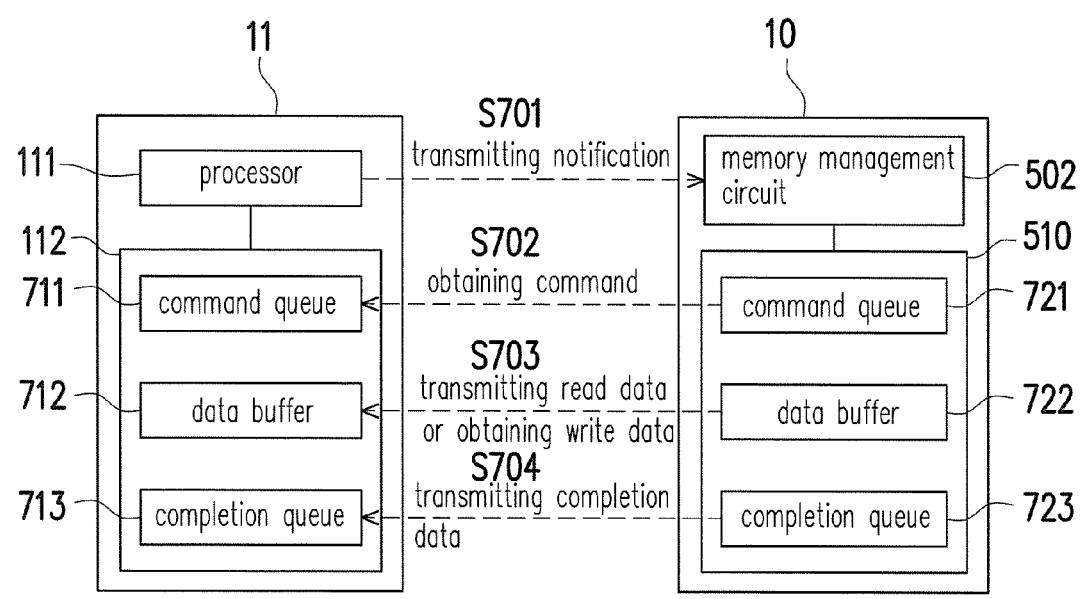
FIG. 7 is a schematic view illustrating a data transmitting operation according to an exemplary embodiment of the disclosure.

FIG. 7 is a schematic view illustrating a data transmitting operation according to an exemplary embodiment of the disclosure.

Referring to FIG. 7, when the host system 11 intends to perform an access operation on the memory storage device 10 (e.g., reading data from or writing data to the memory storage device 10), the processor 111 of the host system 11 may store prepared commands in a command queue 711. Then, the processor 111 may transmit a notification to the memory storage device 10 (Step S701). In an exemplary embodiment, the operation of Step S701 is also referred to as "ring". It should be noted that, under the NVM express interface standard, after the notification is sent, an active action of the host system 11 ends.

The memory management circuit 502 may receive the notification and actively read one or more commands corresponding to the notification from the command queue 711 (Step S702). For example, the obtained command may be temporarily stored in a command queue 721. Based on the command in the command queue 721, the memory management circuit 502 may perform the corresponding access operation. For example, based on a reading command, the memory management circuit 502 may perform a data reading operation on the rewritable non-volatile memory module 406 and transmit the obtained read data from a data buffer 722 to the host system 11 (Step S703). For example, the read data may be stored in a data buffer 712 of the host system 11. Alternatively, based on a write command, the memory management circuit 502 may actively read write data from the data buffer 712 and temporarily store the write data in the data buffer 722 (Step S703). Then, the memory management circuit 502 may perform a data writing operation on the rewritable non-volatile memory module 406 to write the write data buffered in the data buffer 722 into the rewritable non-volatile memory module 406.

In correspondence with the completion of an access operation, the memory management circuit 502 may generate a completion message, and the completion message may be buffered in a completion queue 723. The completion message serves to notify the host system 11 that the access operation corresponding to a command is completed. At a specific time point, completion data including the completion message may be sequentially transmitted to the host system 11 and temporarily stored in a completion queue 713 of the host system 11 (Step S704). According to the data in the completion queue 713, the host system 11 may obtain an accessed data amount, a data access speed, and the like of the memory storage device 10 corresponding to one or more access commands.

In the exemplary embodiment shown in FIG. 7, the command queue 711, the data buffer 712, and the completion queue 713 are arranged in the random access memory 112 of the host system 11, and the command queue 721, the data buffer 722, and the completion queue 723 are arranged in the buffer memory 510 of the memory storage device 10. However, in another exemplary embodiment, any of the command queue 711, the data buffer 712, and the completion queue 713 may also be arranged in other storage media of the host system 11, and any of the command queue 721, the data buffer 722, and the completion queue 723 may also be arranged in other storage media (e.g., the rewritable non-volatile memory module 406) of the memory storage device 10.

More specifically, when the memory management circuit 502 obtains a command (also referred to as "first command" in the following) from the host system 11, the memory management circuit 502 may start to count a time value (also referred to as "first time value" in the following). As time proceeds, the first time value being counted may continuously increase. In addition, the memory management circuit 502 may also transmit an access command sequence (also referred to as "first access command sequence" in the following) to instruct to perform an access operation (also referred to as "first access operation" in the following) corresponding to the first command on the rewritable non-volatile memory module 406. When the first access operation is completed, the memory management circuit 502 may generate a completion message (also referred to as "first completion message" in the following) corresponding to completion of the first access operation and buffer (i.e., temporarily store) the first completion message in a buffer area. For example, the completion queue 723 of the exemplary embodiment shown in FIG. 7 is in the buffer area, and the buffer area may also be arranged in the buffer memory 510 or the rewritable non-volatile memory module 406. Then, the memory management circuit 502 may determine whether the first time value meets a waiting time value (also referred to as "first waiting time value" in the following). If the first time value does not meet the first waiting time value (e.g., the first time value is smaller than the first waiting time value), the memory management circuit 502 may continue to temporarily store the first completion message in the buffer area. Alternatively, if the first time value meets the first waiting time value (e.g., the first time value is equal to or greater than the first waiting time value), the memory management circuit 502 may transmit the first completion massage buffered in the buffer area to the host system 11.

In other words, in the exemplary embodiment of FIG. 7, even if there is one or more completion messages to be transmitted in the completion queue 723, it is still possible that the memory management circuit 502 may not timely transmit the completion messages to the host system 11, but wait until the time value of one completion message to reach the waiting time value and then transmit such completion message to the host system 11. Controlling the time point of transmitting each completion message or a time interval between any two completion messages may allow the host system 11 to determine that the data access speed of the memory storage system 10 is stable based on the received completion message.

Figure 8:
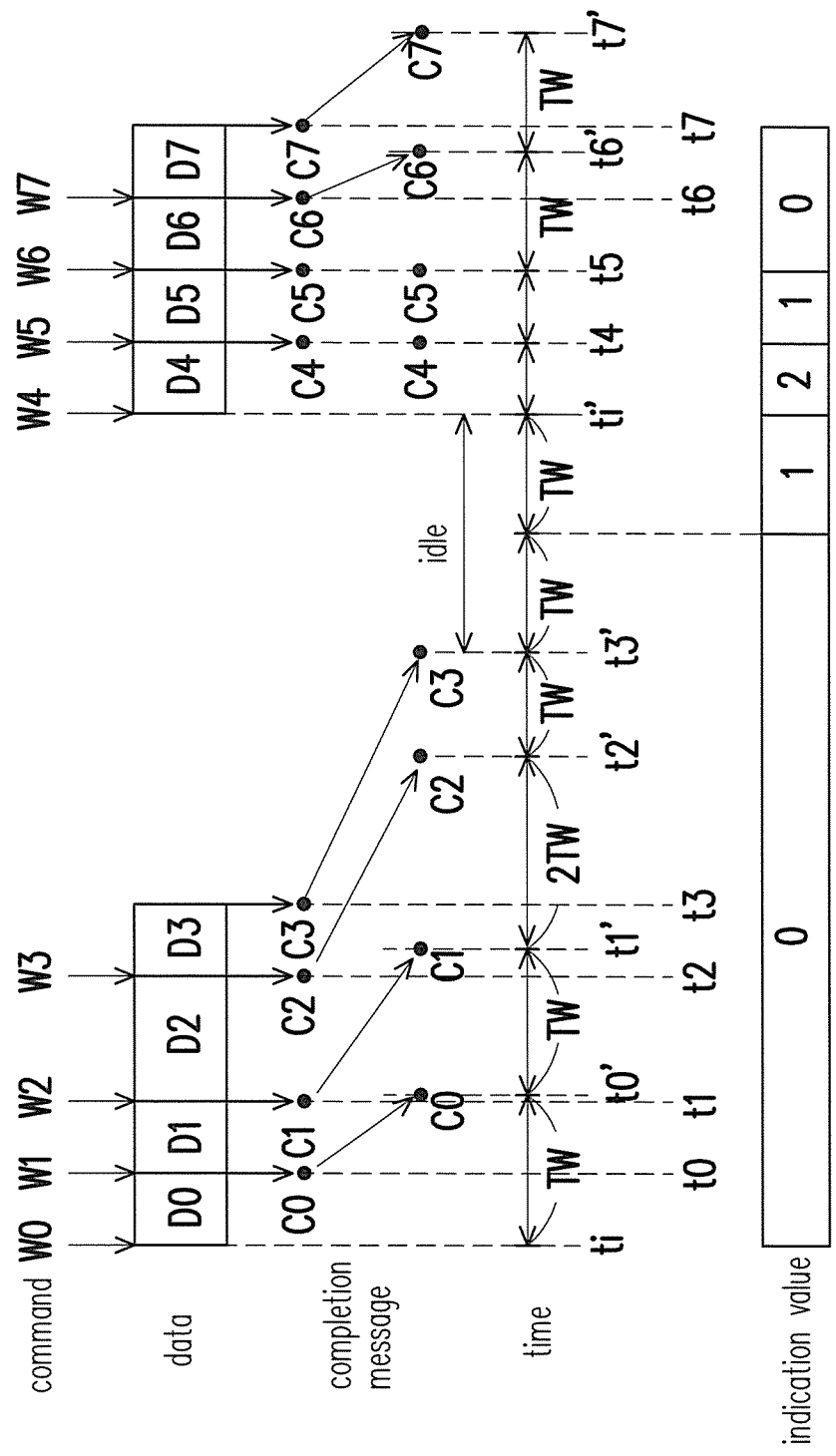
FIG. 8 is a schematic view illustrating an operation of managing completion messages according to an exemplary embodiment of the disclosure.

FIG. 8 is a schematic view illustrating an operation of managing completion messages according to an exemplary embodiment of the disclosure.

Referring to FIG. 8, it is assumed herein that the memory management circuit 502 continuously obtains commands W0 to W3 from the host system 11, and each of the commands W0 to W3 is a writing command. At a time point ti, the memory management circuit 502 starts to execute an access operation corresponding to the command W0. For example, the memory management circuit 502 may obtain data D0 from the host system 11 and instructs the rewritable non-volatile memory module 406 to store the data D0.

Assuming that the access operation corresponding to the command W0 is completed at a time point t0, the memory management circuit 502 may generate a completion message C0. The completion message C0 may be buffered in a buffer area (e.g., the completion queue 723 shown in FIG. 7) and serve to notify the host system 11 that the access operation corresponding to the command W0 is completed. Then, the memory management circuit 502 may continue to perform an access operation corresponding to the next command W1. For example, the memory management circuit 502 may obtain data D1 from the host system 11 and instructs the rewritable non-volatile memory module 406 to store the data D1.

Assuming that the access operation corresponding to the command W1 is completed at a time point t1, the memory management circuit 502 may generate a completion message C1. The completion message C1 may also be temporarily stored in the buffer area and serve to notify the host system 11 that the access operation corresponding to the command W1 is completed. Then, the memory management circuit 502 may continue to perform an access operation corresponding to the next command W2. For example, the memory management circuit 502 may obtain data D2 from the host system 11 and instructs the rewritable non-volatile memory module 406 to store the data D2.

Based on the same principle, at a time point t2, an access operation corresponding to the write data D2 is completed, and a completion message C2 is generated. The completion message C2 serves to notify the host system 11 that the access operation corresponding to the command W2 is completed. Then, an access operation of the next command W3 is performed and data D3 is obtained from the host system 11 and written to the rewritable non-volatile memory module 406. At a time point t3, the access operation with respect to the data D3 is completed, and a completion message C3 is generated. The completion message C3 serves to notify the host system 11 that the access operation corresponding to the command W3 is completed. The completion messages C2 and C3 are temporarily stored in the buffer area.

Besides, at the time point ti (i.e., the time point when the access operation corresponding to the command W0 starts to be performed), the memory management circuit 502 may activate a counter and start to count a time value corresponding to the command W0. As time proceeds, the time value may gradually increase. After the completion message C0 is generated, the memory management circuit 502 may determine whether a time duration of the counted time value reaches a time duration TW of a waiting time value. The time duration TW is longer than a time duration of the time for performing the access operation corresponding to the command W0 (i.e., a time duration between the time points ti and t0). At a time point t0', the time duration corresponding to the time value counted for the command W0 (i.e., a time duration between the time points ti and t0') is equal to the time duration TW. Therefore, the memory management circuit 502 transmits the completion message C0 temporarily stored in the buffer area to the host system 11.

At the time point t0' (i.e., the time point when the temporarily stored completion message C0 is transmitted), the memory management circuit 502 may activate a counter and start to count a time value corresponding to the command W1. As time proceeds, the time value may gradually increase as well. The memory management circuit 502 may determine whether a time duration of the counted time value reaches the time duration TW of the waiting time value. The time duration TW is longer than a time duration of the time for performing the access operation corresponding to the command W1 (i.e., the time duration between the time points t0 and t1). At a time point t1', the time duration corresponding to the time value counted for the command W1 (i.e., a time duration between the time points t0' and t1') is equal to the time duration TW. Therefore, the memory management circuit 502 transmits the completion message C1 temporarily stored in the buffer area to the host system 11.

At the time point t1' (i.e., the time point when the temporarily stored completion message C1 is transmitted), the memory management circuit 502 may activate a counter and start to count a time value corresponding to the command W2. As time proceeds, the time value may gradually increase as well. The memory management circuit 502 may determine whether a time duration of the counted time value reaches a time duration 2TW (i.e., 2×TW) of another waiting time value. The time duration 2TW is longer than a time duration of the time for performing the access operation corresponding to the command W2 (i.e., the time duration between the time points t1 and t2). At a time point t2', the time duration corresponding to the time value counted for the command W2 (i.e., a time duration between the time points t1' and t2') is equal to the time duration 2TW. Therefore, the memory management circuit 502 transmits the completion message C2 temporarily stored in the buffer area to the host system 11.

At the time point t2' (i.e., the time point when the temporarily stored completion message C2 is transmitted), the memory management circuit 502 may activate a counter and start to count a time value corresponding to the command W3. As time proceeds, the time value may gradually increase as well. The memory management circuit 502 may determine whether a time duration of the counted time value reaches the time duration TW of the waiting time value. The time duration TW is longer than a time duration of the time for performing the access operation corresponding to the command W3 (i.e., the time duration between the time points t2 and t3). At a time point t3', the time duration corresponding to the time value counted for the command W3 (i.e., a time duration between the time points t2' and t3') is equal to the time duration TW. Therefore, the memory management circuit 502 transmits the completion message C3 temporarily stored in the buffer area to the host system 11.

It should be noted that, in an exemplary embodiment, the time duration of the waiting time value set to control transmission of a completion message is positively correlated to the data amount of the data that a command corresponding to the completion message instructs to access. For example, in an exemplary embodiment of FIG. 8, the data amount of the data D2 that the command W2 instructs to write is approximately two times the data amount of the data D1 that the command W1 instructs to write. Therefore, the time duration of the waiting time value set to control the transmission of the completion message C2 is two times the time duration TW of the waiting time value (i.e., 2×TW) set to control the transmission of the completion message C1.

In an exemplary embodiment of FIG. 8, the time duration TW is a time duration of one unit waiting time and corresponds to one data unit. For example, in an exemplary embodiment of FIG. 8, the data amount of each of the data D0, D1, and D3 is one data unit, such as 8 KB, whereas the data amount of the data D2 is two data units, such as 16 KB. In addition, the data amount of data that a command instructs to access may be estimated based on a total number of logical units used by the data.

In an exemplary embodiment, a waiting time PVi corresponding to a completion message of a command Wi may be calculated based on Equation (1) as follows:

$$PVi = TW \times (NLBi + 1) \quad (1)$$

Here, the parameter TW represents a time duration of one unit waiting time, and the parameter (NLBi+1) represents the total number of logical units used for the data that the command Wi instructs to access. For example, according to Equation (1), the time duration of the waiting time corresponding to the data D1 that the command W1 of FIG. 8 instructs to write is set to be TW, and the time duration of the waiting time corresponding to the data D2 that the command W2 instructs to write is set to be 2TW. Other time durations may be counted based on the same principle.

In the exemplary embodiment of FIG. 8, it is assumed that, after the time point t3', no access operation needs to be performed until an access operation of the next command W4 at a time point ti'. Therefore, between the time points t3' and ti', the memory storage device 10 and the host system are in an idle state. In the idle state, no completion message is transmitted to the host system 11. In an exemplary embodiment, the memory management circuit 502 may further count a response idle time value corresponding to a time duration of the idle state. For example, the response idle time is set to represent that how many unit waiting times as a whole equals to the time duration of the idle state. The memory management circuit 502 may update an indication value based on the response idle time value. It should be noted that, contrary to the waiting time value serving to postpone the time point of transmitting the corresponding completion message, the indication value serves to reduce or skip the waiting time value of the subsequent command.

Referring to FIG. 8 again, before entering the idle state (i.e., before the time point t3'), the indication value is "0", indicating that no waiting time value needs to be reduced or skipped. In the idle state, after one unit waiting time, the indication value is updated to "1", indicating that one unit waiting time may be skipped for the subsequent command. At the time point ti', the time duration of the idle state reaches two units waiting time (i.e., the time duration of 2TW), so the indication value is updated to "2", indicating that two units waiting time may be skipped for the subsequent command.

After the time point ti', the memory management circuit 502 sequentially executes commands W4 to W7 from the host system 11, and each of the commands W4 to W7 is a writing command. For example, at the time point ti', the memory management circuit 502 may obtain data D4 from the host system 11 and instructs the rewritable non-volatile memory module 406 to store the data D4. Assuming that the access operation corresponding to the command W4 is completed at a time point t4, the memory management circuit 502 may generate a completion message C4. The completion message C4 may also be temporarily stored in the buffer area and serve to notify the host system 11 that the access operation corresponding to the command W4 is completed. Then, the memory management circuit 502 may continue to perform an access operation corresponding to the next command W5. For example, the memory management circuit 502 may obtain data D5 from the host system 11 and instructs the rewritable non-volatile memory module 406 to store the data D5.

Based on the same principle, at a time point t5, an access operation corresponding to the write data D5 is completed, and a completion message C5 is generated. The completion message C5 serves to notify the host system 11 that the access operation corresponding to the command W5 is completed. Then, an access operation of the next command W6 is performed and data D6 is obtained from the host system 11 and written to the rewritable non-volatile memory module 406. At a time point t6, the access operation with respect to the data D6 is completed, and a completion message C6 is generated. The completion message C6 serves to notify the host system 11 that the access operation corresponding to the command W6 is completed. Then, an access operation of the next command W7 is performed and data D7 is obtained from the host system 11 and written to the rewritable non-volatile memory module 406. At a time point t7, the access operation with respect to the data D7 is completed, and a completion message C7 is generated. The completion message C7 serves to notify the host system 11 that the access operation corresponding to the command W7 is completed. The completion messages C4 to C7 are temporarily stored in the buffer area.

Corresponding to the completion message C4, the memory management circuit 502 may determine whether the indication value and the data amount of the data that the command W4 instructs to access meet a condition (referred to as "first condition" in the following). For example, the current indication value is "2", indicating that two units waiting time can be skipped, and the data amount of the data D4 is one data unit. Therefore, after the completion message C4 is generated, the memory management circuit 502 may allow the completion message C4 to be transmitted from the buffer area to the host system 11 immediately. Since one unit waiting time is skipped in correspondence with the completion message C4, the indication value is updated to "1", indicating that one unit waiting time can still be skipped.

Corresponding to the completion message C5, the memory management circuit 502 may also determine whether the indication value and the data amount of the data that the command W5 instructs to access meets the first condition. Since the current indication value is "1", and the data amount of the data D5 is also one data unit, after generation of the completion message C5, the memory management circuit 502 may also allow the completion message C5 to be transmitted from the buffer area to the host system 11 immediately. Since one unit waiting time is skipped in correspondence with the completion message C5, the indication value is updated to "0", indicating that no unit waiting time can be skipped afterwards.

Corresponding to the completion message C6, the memory management circuit 502 may also determine whether the indication value and the data amount of the data that the command W6 instructs to access meets the first condition. Since the current indication value is "0", and the data amount of the data D6 is also one data unit, after generation of the completion message C6, the memory management circuit 502 may determine another waiting time value (referred to as "second waiting time value" in the following) based on the indication value and the data amount of the data D6. The second waiting time value is set to control a time point for transmitting the completion message C6 to the host system. For example, assuming that the data amount of a certain data is "N" data units (e.g., "N" logical units are used for the data) and the current indication value is "M" (i.e., "M" units waiting time can be skipped), if a value of "N-M" is smaller than or equal to zero (i.e., the current indication value and the data amount of the data that the command instructs to access meet the first condition), the memory management circuit 502 may directly transmit the corresponding completion message, such as the completion messages C4 and C5. Alternatively, if the value of "N-M" is greater than zero (i.e., the current indication value and the data amount of the data that the command instructs to access do not meet the first condition), the memory management circuit 502 may set a time duration of the second waiting time value as a time duration of "N-M" units waiting time. For example, since the data amount of the data D6 is one data unit, and the current indication value is "0", the time duration of the second waiting time value corresponding to the completion message C6 may be set to be a time duration of one unit waiting time (e.g., 1−0=1). Thus, at the time point t5 (i.e., the time point of transmitting the completion message C5), the memory management circuit 502 may start to count a time value corresponding to the command W6, and transmits the completion message C6 temporarily stored in the buffer area to the host system 11 at a time point t6' after waiting for one unit waiting time.

Based on the same principle, since the data amount of the data D7 is one data unit, and the current indication value is "0", the time duration of the second waiting time value corresponding to the completion message C7 may also be set to be a time duration of one unit waiting time. Thus, at the time point t6' (i.e., the time point of transmitting the completion message C6), the memory management circuit 502 may start to count a time value corresponding to the command W7, and transmits the completion message C7 temporarily stored in the buffer area to the host system 11 at a time point t7' after waiting for one unit waiting time.

As another example, in another exemplary embodiment of FIG. 8, if the data amount of the data that the command W4 instructs to access is five data units and the current indication value is "2" (i.e., two units waiting time can be skipped), the memory management circuit 502 may set the time duration of the second waiting time value corresponding to the completion message C4 as a time duration of three (5−2=3) units of waiting time (i.e., 3×TW). Accordingly, transmission of the completion message C4 may be postponed for a time duration of three units of waiting time from the time point ti'. Based on the same principle, time points of transmitting the rest completion messages may be correspondingly determined.

It should be noted that, even though the present exemplary embodiment of FIG. 8 is described with an example where the commands W0 to W7 instruct to write data to the rewritable non-volatile memory module 406, in other exemplary embodiments not described herein, the commands W0 to W7 may replaced with commands that instruct the rewritable non-volatile memory module 406 to read data, and time points of transmitting completion messages notifying that data reading operations are completed may be correspondingly controlled. Thus, details in this respect will not be reiterated in the following.

Besides, as shown in the present exemplary embodiment of FIG. 8, by postponing the time points of transmitting most of the completion messages and deducting some subsequent delay time by the response idle time, the completion message corresponding to each data unit may be transmitted more stably. For example, on average, the frequency of transmitting a plurality of completion messages may be controlled such that the completion message of one data unit is transmitted about every time duration TW of one unit waiting time. For example, the time duration TW may be 10 µs. However, the disclosure does not intend to impose a limitation on the value of the time duration TW. Correspondingly, the host system 11 may determine that the data access speed of the memory storage device 10 is stable based on the stably transmitted completion messages.

In an exemplary embodiment, the memory management circuit 502 may further determine whether the total number of completion messages buffered in the buffer area reaches a threshold value (also referred to as "first threshold value" in the following). If the total number of the completion messages temporarily stored in the buffer area reaches the first threshold value, the memory management circuit 502 may suspend an access operation on the rewritable non-volatile memory module 406 corresponding to a command from the host system 11. Then, if the total number of completion messages temporarily stored in the buffer area is reduced to another threshold value (also referred to as "second threshold value" in the following), the memory management circuit 502 may allow the suspended access operation to be performed. Here, the first threshold value is equal to or greater than the second threshold value.

Figure 9:
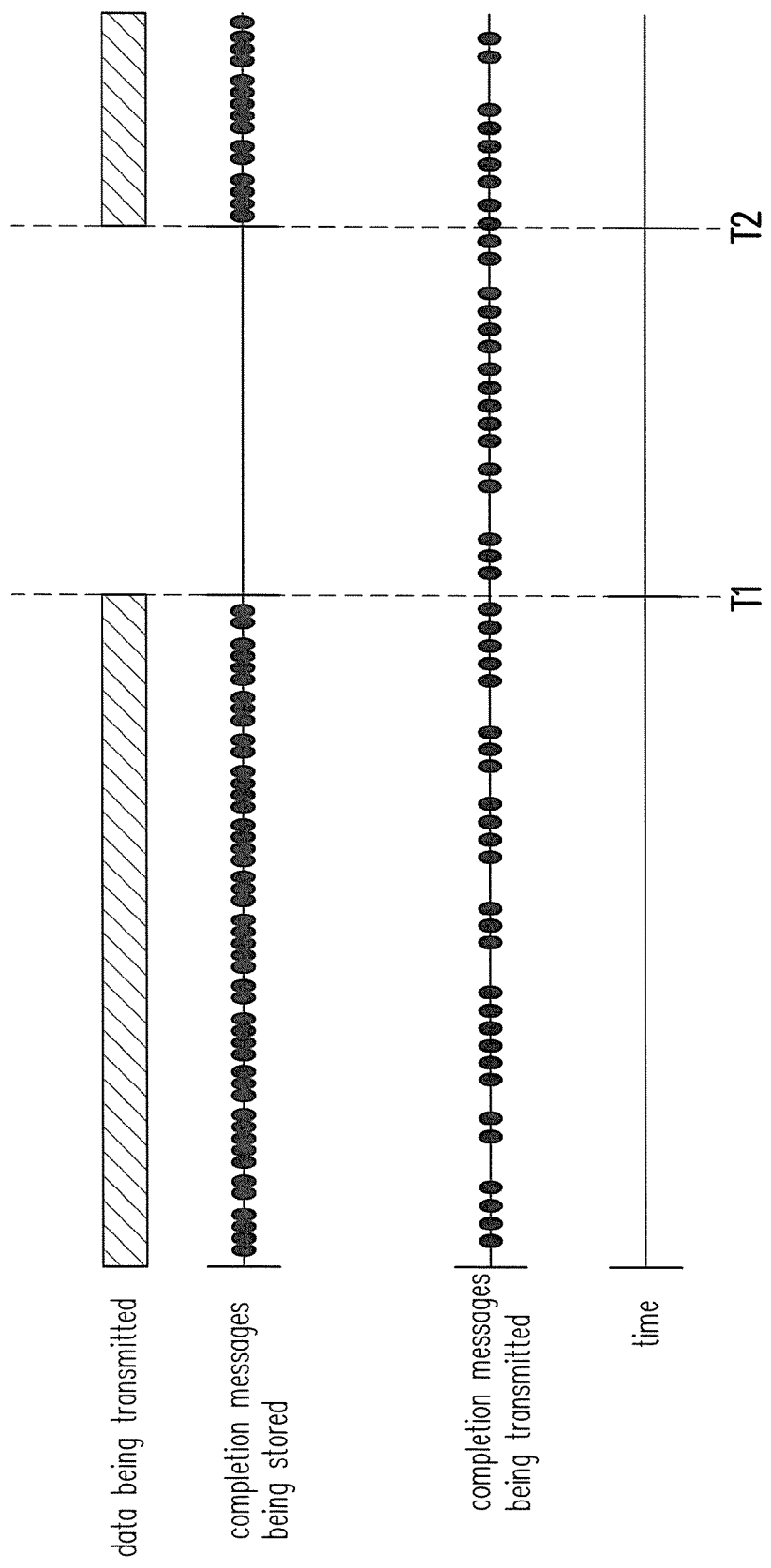
FIG. 9 is a schematic view illustrating an operation of managing completion messages according to another exemplary embodiment of the disclosure.

FIG. 9 is a schematic view illustrating an operation of managing completion messages according to another exemplary embodiment of the disclosure.

Referring to FIG. 9, before the time point T1, many data are transmitted between the memory storage device 10 and the host system 11 and many new completion messages are temporarily stored in the buffer area. Assuming that, at the time point T1, the memory management circuit 502 determines that the total number of the completion messages currently buffered in the buffer area reaches the first threshold value, the memory management circuit 502 may suspend the access operation on the rewritable non-volatile memory module 406 corresponding to the command from the host system 11. In the meantime, no new completion message is added to the buffer area. However, during the period when the access operation on the rewritable non-volatile memory module 406 corresponding to the command from the host system 11 is suspended, the completion messages already buffered in the buffer area may continue to be sent to the host system 11. Accordingly, there may not be too many completion messages to be transmitted pending in the buffer area. Then, at the time point T2, since the total number of completion messages temporarily stored in the buffer area is reduced to the second threshold value, the memory management circuit 502 may allow the previously suspended access operation to be performed. For example, after the time point T2, data is again allowed to be transmitted between the memory storage device 10 and the host system 11, and corresponding completion messages also start to be newly buffered in the buffer area.

Figure 10:
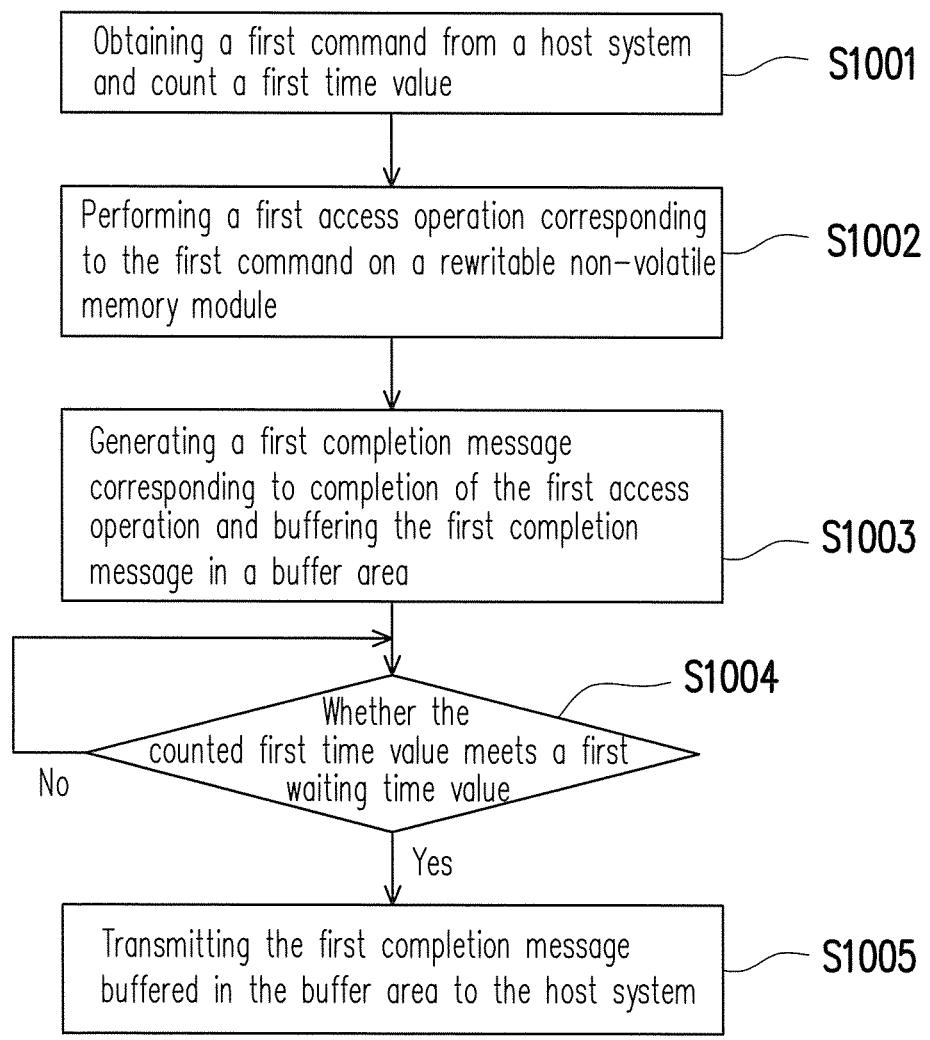
FIG. 10 is a flowchart illustrating a data transmission method according to an exemplary embodiment of the disclosure.

FIG. 10 is a flowchart illustrating a data transmission method according to an exemplary embodiment of the disclosure.

Referring to FIG. 10, at Step S1001, the first command is obtained from the host system, and the first time value is counted. At Step S1002, the first access operation corresponding to the first command is performed on the rewritable non-volatile memory module. At Step S1003, the first completion message corresponding to completion of the first access operation is generated, and the first completion message is buffered in the buffer area. At Step S1004, whether the first time value that is counted meets the first waiting time value is determined. If the first time value that is counted meets the first waiting time value, at Step 1005, the first completion message buffered in the buffer area is transmitted to the host system. If the first time value that is counted does not the first waiting time value, the process returns to Step S1004 until it is determined that the first time value that is counted meets the first waiting time value at Step S1004.

Details of the respective steps in FIG. 10 are already described above, and thus not repeated in the following. It should be noted that the respective steps in FIG. 10 may be implemented as a plurality of programming codes or circuits, and the disclosure does not intend to impose any limitation in this regard. Besides, the method of FIG. 10 may be applied solely or together with the present exemplary embodiments. The disclosure does not intend to impose any limitation in this regard, either.

In view of the foregoing, after the access command is obtained from the host system, the time value corresponding to the access command starts to be counted, and the access operation corresponding to the access command is performed. After the completion message corresponding to completion of the access operation is generated, the completion message is temporarily stored in the buffer area. When the time value that is counted meets the waiting time value, the completion message is retrieved from the buffer area and transmitted to the host system. Compared with a case where no delay is set for the transmission of the completion message, the exemplary embodiments of the disclosure may stabilize the data access speed detected by the host system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data transmission method for a memory storage device comprising a rewritable non-volatile memory module, the data transmission method comprising:
    obtaining a first command from a host system and counting a first time value;
    performing a first access operation corresponding to the first command on the rewritable non-volatile memory module;
    generating a first completion message corresponding to completion of the first access operation and buffering the first completion message in a buffer area; and
    transmitting the first completion message buffered in the buffer area to the host system if the first time value meets a first waiting time value.

2. The data transmission method as claimed in claim 1, wherein a time duration of the first waiting time value is longer than a time duration of a second time value for performing the first access operation.

3. The data transmission method as claimed in claim 1, wherein the first time value starts to be counted at a time point when the first access operation starts to be performed or at a time point when a second completion message corresponding to completion of a second access operation is transmitted,
    wherein the second access operation is performed corresponding to a second command that is obtained from the host system earlier than the first command.

4. The data transmission method as claimed in claim 1, wherein a time duration of the first waiting time value is positively correlated to a data amount of data that the first command instructs to access.

5. The data transmission method as claimed in claim 1, further comprising:
    counting a response idle time value and updating an indication value based on the response idle time value;
    obtaining a third command from the host system after the response idle time value starts to be counted;
    allowing a third completion message corresponding to completion of a third access operation to be transmitted to the host system after the third access operation corresponding to the third command is completed if the indication value and a data amount of data that the third command instructs to access meet a first condition; and
    determining a second waiting time value based on the indication value and the data amount of the data that the third command instructs to access if the indication value and the data amount of the data that the third command instructs to access do not meet the first condition, wherein the second waiting time value is set to control a time point for transmitting the third completion message to the host system.

6. The data transmission method as claimed in claim 1, further comprising:
    obtaining a fourth command from the host system;
    suspending a fourth access operation corresponding to the fourth command on the rewritable non-volatile memory module if a total number of completion messages buffered in the buffer area reaches a first threshold value; and
    allowing the fourth access operation to be performed if the total number of the completion messages buffered in the buffer area is reduced to a second threshold value.

7. The data transmission method as claimed in claim 6, further comprising:

during a period when the fourth access operation is suspended, continuing to transmit the completion messages buffered in the buffer area to the host system.

8. The data transmission method as claimed in claim 1, wherein the memory storage device is compatible with a non-volatile memory express (NVM express) interface standard.

9. A memory storage device, comprising:
- a connection interface unit, configured to be coupled to a host system;
- a rewritable non-volatile memory module; and
- a memory control circuit unit, coupled to the connection interface unit and the rewritable non-volatile memory module,
- wherein the memory control circuit unit is configured to obtain a first command from the host system and count a first time value,
- wherein the memory control circuit unit is further configured to transmit a first access command sequence to instruct to perform a first access operation corresponding to the first command on the rewritable non-volatile memory module,
- wherein the memory control circuit unit is further configured to generate a first completion message corresponding to completion of the first access operation and buffer the first completion message in a buffer area,
- wherein if the first time value meets a first waiting time value, the memory control circuit unit is further configured to transmit the first completion message buffered in the buffer area to the host system.

10. The memory storage device as claimed in claim 9, wherein a time duration of the first waiting time value is longer than a time duration of a second time value for performing the first access operation.

11. The memory storage device as claimed in claim 9, wherein the first time value starts to be counted at a time point when the first access operation starts to be performed or at a time point when a second completion message corresponding to completion of a second access operation is transmitted,
- wherein the second access operation is performed corresponding to a second command that is obtained from the host system earlier than the first command.

12. The memory storage device as claimed in claim 9, wherein a time duration of the first waiting time value is positively correlated to a data amount of data that the first command instructs to access.

13. The memory storage device as claimed in claim 9, wherein the memory control circuit unit is further configured to count a response idle time value and update an indication value based on the response idle time value,
- wherein the memory control circuit unit is further configured to obtain a third command from the host system after the response idle time value is started to be counted,
- wherein the memory control circuit unit is further configured to allow a third completion message corresponding to completion of a third access operation to be transmitted to the host system after the third access operation corresponding to the third command is completed if the indication value and a data amount of data that the third command instructs to access meet a first condition,
- wherein the memory control circuit unit is further configured to determine a second waiting time value based on the indication value and the data amount of the data that the third command instructs to access if the indication value and the data amount of the data that the third command instructs to access do not meet the first condition, wherein the second waiting time value is set to control a time point for transmitting the third completion message to the host system.

14. The memory storage device as claimed in claim 9, wherein the memory control circuit unit is further configured to obtain a fourth command from the host system,
- wherein the memory control circuit unit is further configured to suspend a fourth access operation corresponding to the fourth command on the rewritable non-volatile memory module if a total number of completion messages buffered in the buffer area reaches a first threshold value,
- wherein the memory control circuit unit is further configured to allow the fourth access operation to be performed if the total number of the completion messages buffered in the buffer area is reduced to a second threshold value.

15. The memory storage device as claimed in claim 14, wherein during a period when the fourth access operation is suspended, the memory control circuit unit is further configured to continue to transmit the completion messages buffered in the buffer area to the host system.

16. The memory storage device as claimed in claim 9, wherein the memory storage device is compatible with a non-volatile memory express (NVM express) interface standard.

17. A memory control circuit unit for controlling a rewritable non-volatile memory module, the memory control circuit unit comprising:
- a host interface, configured to be coupled to a host system;
- a memory interface, configured to be coupled to the rewritable non-volatile memory module; and
- a memory management circuit, coupled to the host interface and the memory interface,
- wherein the memory management circuit is configured to obtain a first command from the host system and count a first time value,
- wherein the memory management circuit is further configured to transmit a first access command sequence to instruct to perform a first access operation corresponding to the first command on the rewritable non-volatile memory module,
- wherein the memory management circuit is further configured to generate a first completion message corresponding to completion of the first access operation and buffer the first completion message in a buffer area,
- wherein the memory management circuit is further configured to transmit the first completion message buffered in the buffer area to the host system if the first time value meets a first waiting time value.

18. The memory control circuit unit as claimed in claim 17, wherein a time duration of the first waiting time value is longer than a time duration of a second time value for performing the first access operation.

19. The memory control circuit unit as claimed in claim 17, wherein the first time value starts to be counted at a time point when the first access operation starts to be performed or at a time point when a second completion message corresponding to completion of a second access operation is transmitted,
- wherein the second access operation is performed corresponding to a second command that is obtained from the host system earlier than the first command.

20. The memory control circuit unit as claimed in claim 17, wherein a time duration of the first waiting time value is positively correlated to a data amount of data that the first command instructs to access.

21. The memory control circuit unit as claimed in claim 17, wherein the memory management circuit is further configured to count a response idle time value and update an indication value based on the response idle time value,
- wherein the memory management circuit is further configured to obtain a third command from the host system after the response idle time value is started to be counted,
- wherein the memory management circuit is further configured to allow a third completion message corresponding to completion of a third access operation to be transmitted to the host system after the third access operation corresponding to the third command is completed if the indication value and a data amount of data that the third command instructs to access meet a first condition,
- wherein the memory management circuit is further configured to determine a second waiting time value based on the indication value and the data amount of the data that the third command instructs to access if the indication value and the data amount of the data that the third command instructs to access do not meet the first condition, wherein the second waiting time value is set to control a time point for transmitting the third completion message to the host system.

22. The memory control circuit unit as claimed in claim 17, wherein the memory management circuit is further configured to obtain a fourth command from the host system,
- wherein the memory management circuit is further configured to suspend a fourth access operation corresponding to the fourth command on the rewritable non-volatile memory module if a total number of completion messages buffered in the buffer area reaches a first threshold value,
- wherein the memory management circuit is further configured to allow the fourth access operation to be performed if the total number of the completion messages buffered in the buffer area is reduced to a second threshold value.

23. The memory control circuit unit as claimed in claim 22, wherein during a period when the fourth access operation is suspended, the memory management circuit is further configured to continue to transmit the completion messages buffered in the buffer area to the host system.

24. The memory control circuit unit as claimed in claim 17, wherein the memory control circuit unit is compatible with a non-volatile memory express (NVM express) interface standard.

* * * * *